EXCLUSIVE OR LOGICAL CIRCUIT

Filed Oct. 22, 1956

INVENTOR
JAMES W. WOOD

BY [signature]
ATTORNEY

United States Patent Office 2,995,666 Patented Aug. 8, 1961

2,995,666

EXCLUSIVE OR LOGICAL CIRCUIT

James W. Wood, Waltham, Mass., assignor to Laboratory for Electronics, Inc., Boston, Mass., a corporation of Delaware Filed Oct. 22, 1956, Ser. No. 617,540
6 Claims. (Cl. 307—88.5)

The present invention relates in general to signal translating apparatus and in particular to a transistor circuit which is especially useful in the conversion of cyclically encoded binary signals to signals encoded in standard binary form. A logical circuit according to the invention reliably effects this conversion with relatively few components which dissipate negligible amounts of power.

Where it is desired to represent in binary form an analog quantity related to the position of a mechanical element, cyclic code is commonly employed in the analog-to-binary conversion. This code is preferred because an increment of change in mechanical position just large enough to be sensed is indicated always by a change of only one digit in the binary number representation. Frequently, it is desired to combine in a digital computer a signal indicative of the analog quantity with other signals which are in standard binary form. In order to perform the desired operations, it is first necessary to convert the signal in cyclic binary form into a corresponding signal in standard binary form.

If a number is represented in cyclic binary code in the form $X_1X_2 \ldots X_N$ where each digit X may be either Zero or One and the lowest subscript is associated with the digit of most significance, the equivalent standard binary number is represented by $Y_1Y_2 \ldots Y_N$ in which $Y_{N-1}$ is compared with $X_N$ to determine the value of $Y_N$, the latter digit being One only when the digits compared are unlike; otherwise being Zero.

The binary digits One and Zero are frequently represented electrically by the presence and absence respectively of a pulse or voltage level. The common method for translation of cyclic code signals to standard binary code signals utilizes apparatus comprising two logical inverters, two AND gates, and an OR gate. A typical instrumentation of such apparatus includes a pair of transistors or tubes, six diodes and five resistors.

The present invention contemplates and has as a primary object the provision of a logical circuit, suitable for the translation of cyclic code signals to standard binary code signals, which is reliable in operation, consumes negligible power, and is formed of a minimum number of compactly arranged components.

Another object of the invention is to provide a logical circuit according to the preceding object which may be readily cascaded to provide substantially instantaneous translation of an input cyclic binary number signal in parallel form to an output standard binary number signal, also in parallel form.

A further object of the invention is the provision of means for utilizing the novel circuit to translate cyclic binary number signals in serial form to the corresponding standard binary number signal, also in serial form.

An object of the invention is the provision of a logical circuit which provides the desired cyclic-to-standard translation despite variations in the amplitude of input signal pulses.

Basically, the novel circuit includes a pair of semiconductor devices, each having at least base, emitter and collector electrodes. The base of each semiconductor device is coupled to the emitter of the other and the collector electrodes are coupled together. In a more specific form, direct coupling is employed between the base of one device and the emitter of the other and a common load impedance is coupled to the collector electrodes.

For signal translation, the pair of semiconductor devices are coupled to first and second input terminals and may draw current through a common load impedance when in the conducting state. Coupling means are arranged between the semiconductor devices in a manner which precludes either from drawing current except when signals are present on the input terminals having values of a selected characteristic which differ by a predetermined amount, at which time one of the semiconductor devices is rendered conductive.

When energized by first and second binary input signals in which the binary digits One and Zero are represented by the presence and absence respectively of a pulse, the circuit is arranged so that the semiconductor devices are nonconductive except when the presence of a pulse on one input terminal is accompanied by the absence of a pulse on the other.

A plurality of circuits may be cascaded to effect parallel cyclic-to-standard binary conversion by coupling the common load impedance of one stage to the second input terminal of a following stage. The first input terminals are energized with respective signals indicative of a digit of the cyclic binary number, the digit of most significance being associated with the first stage and digits of decreasing significance being associated with a stage correspondingly further along in the cascade.

For serial cyclic-to-standard binary conversion, means are provided for delaying the output signal derived across the common load impedance and applying the delayed output signal to the second input terminal coincidentally with the next digit indicative signal applied to the first input terminal.

Other features, objects and advantages of the invention will become apparent from the following specification when read in connection with the accompanying drawing in which.

Figure 1:
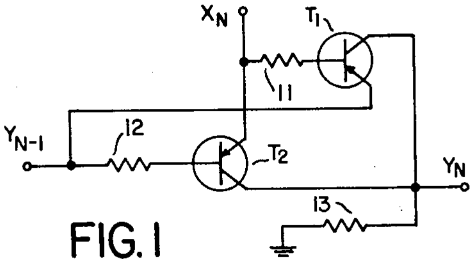
FIG. 1 is a schematic circuit diagram of one example of a transistor circuit arranged according to the invention.

With reference now to the drawing and more particularly FIG. 1 thereof, there is illustrated a circuit arranged according to the invention which utilizes a pair of transistors $T_1$ and $T_2$. The bases of transitsors $T_1$ and $T_2$ are connected to the emitter of the other through current-limiting resistors 11 and 12 respectively and the collector electrodes are connected to a common load impedance, resistor 13. Input terminals $X_N$ and $Y_{N-1}$ are directly connected to emitter electrodes of transitsors $T_1$ and $T_2$ respectively. Output terminal $Y_N$ is directly connected to the collector electrodes of transitsors $T_1$ and $T_2$.

The mode of operation will now be described in connection with use of the circuit for cyclic-to-standard binary conversion by way of example only. Other uses for the novel circuit will be apparent to those skilled in the art without involving a departure from the inventive concepts.

It is convenient to assume that the binary digits One and Zero are represented by the presence and absence respectively of a positive pulse or voltage level. The circuit is arranged so that with signals indicative of like digits present on terminals $X_N$ and $Y_{N-1}$, neither transistor conducts and no output pulse appears across resistor 13. The signal on output terminal $Y_N$ is indicative of the digit Zero at this time. With signals indicative of unlike digits present on input terminals $X_N$ and $Y_{N-1}$, one of the transistors conducts, current flows through resistor 13, and a pulse appears on output terminal $Y_N$, indicative of the digit One. This will be better understood from the following discussion of the electrical conditions for each of the four possible combinations of input signals.

First, consider the case where Zero signals are simultaneously present on terminals $X_N$ and $Y_{N-1}$. Both terminals are at substantially zero potential. The zero potential on the former terminal is coupled to the base of transistor $T_1$ through resistor 11 and directly to the emitter of transistor $T_2$ while the zero potential on the latter terminal is applied to the base of transistor $T_2$ through resistor 12 and directly to the emitter of transistor $T_1$. Thus, there is no difference of potential between base and emitter of either transistor and both remain non-conducting.

If a One is represented by a pulse of +E volts, the simultaneous presence of One signals on the input terminals is accompanied by the base and emitter electrodes of the transistors assuming a potential of substantially +E volts. Again, there is no difference of potential between base and emitter of either transistor, and both remain non-conducting.

Now consider the case where a Zero signal is present on terminal $Y_{N-1}$ concurrently with the presence of a One signal on terminal $X_N$. Since the positive potential of +E volts present on the latter terminal is coupled to the emitter of transistor $T_2$ while the base thereof initially assumes the zero potential of the former terminal, a base-emitter potential of the proper polarity and magnitude to induce transistor $T_2$ to conduct now exists. When conducting, its collector current flows through resistor 13, thereby resulting in a positive pulse appearing on output terminal $Y_N$ for the duration of the pulse on terminal $X_N$. Transistor $T_1$ remains cut off since its emitter becomes negative relative to its base in response to the positive pulse on terminal $X_N$.

Finally, consider the case where a One signal is present on terminal $Y_{N-1}$ and a Zero signal on terminal $X_N$. In this situation, the base of transistor $T_1$ becomes negative relative to its emitter and conduction occurs, the flow of collector current through resistor 13 resulting in the appearance of a positive pulse on terminal $Y_N$.

If the signal applied on terminal $X_N$ is representative of the Nth digit of a cyclic binary number and the signal applied on terminal $Y_{N-1}$ is indicative of the digit preceding the Nth digit of the corresponding standard binary number, the output signal which appears on terminal $Y_N$ is characteristic of the Nth digit of the corresponding standard binary number.

Figure 2:
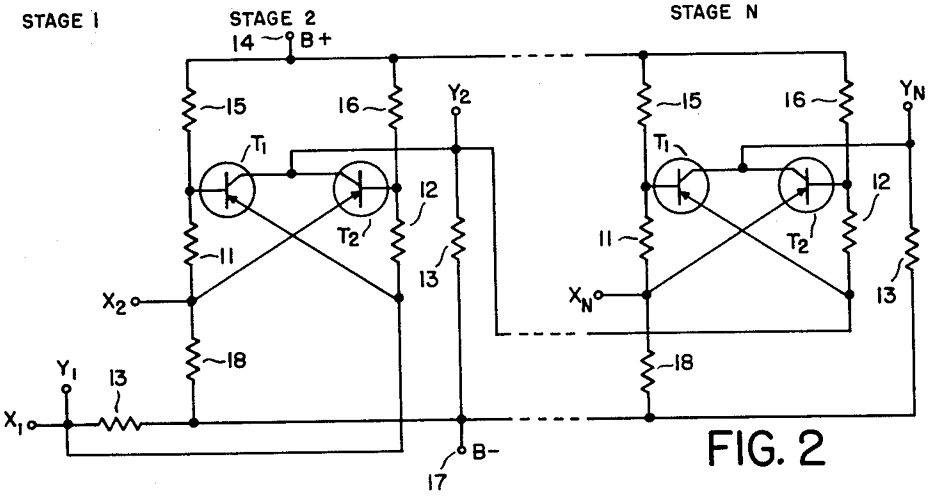
FIG. 2 is a schematic circuit diagram of circuits cascaded according to the invention to effect parallel cyclic-to-standard binary conversion.

With reference to FIG. 2, there is illustrated a schematic circuit diagram of apparatus which when energized with a signal in parallel form characteristic of a cyclic binary number, yields an output signal in parallel form which is indicative of the corresponding standard binary number. Reference numerals which identify corresponding elements in FIG. 1 are retained in FIG. 2. The apparatus is seen to comprise a plurality of cascaded stages, each stage being substantially the same as that illustrated in FIG. 1 with the exception that the bases of transistors $T_1$ and $T_2$ are connected to a source of positive potential on terminal 14 through resistors 15 and 16 respectively, load impedance resistors 13 are connected to a source of negative potential on terminal 17, and the X input terminals are coupled to the latter terminal through resistors 18. Serially-connected resistors 15, 11 and 18, and 16, 12 and 13 arranged between terminals 14 and 17 serve as a biasing network to bias transistors $T_1$ and $T_2$ respectively sufficiently far beyond cutoff so that the circuit is insensitive to pulse amplitude variations, the difference between biasing and cutoff potentials being less than the smallest pulse amplitude. This enables one transistor from each pair to conduct when the associated circuit is energized by a pair of dissimilar digit signals.

Connecting resistor 13 to a source of negative potential instead of ground effectively shifts the operating voltage levels of the circuit. As a result, the digits One and Zero, represented by levels of +E and zero volts in the circuit of FIG. 1, are represented respectively by levels of zero and −E volts in the circuit of FIG. 2.

It is seen that the output across resistor 13 of each stage is coupled to the junction of resistor 12 and the base of transistor $T_1$ of the following stage, thereby energizing the stage with a signal indicative of the standard binary digit $Y_{N-1}$ for the stage. Since the first digit of a cyclic binary number and its corresponding standard binary number are the same, stage 1 is merely a direct connection from terminal $X_1$ to terminal $Y_1$.

Each signal indicative of a respective one of the cyclic binary number digits is applied to respective terminals $X_1, X_2, \ldots X_N$ and output signals indicative of respective ones of the corresponding standard binary number digits are available at the output terminals $Y_1, Y_2, \ldots Y_N$. The mode of operation of each stage is substantially the same as that described in connection with the circuit of FIG. 1.

Figure 4:
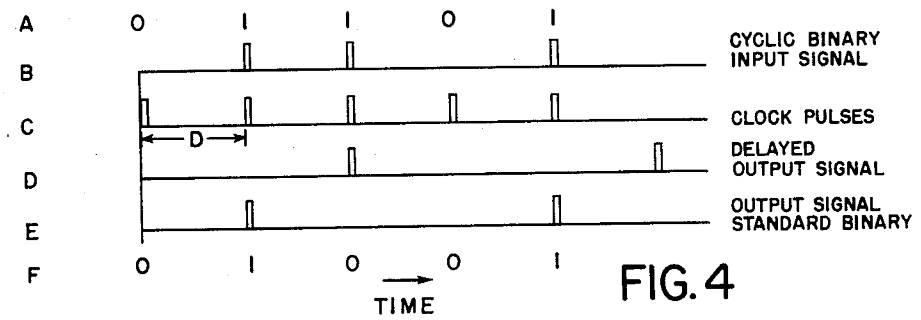
FIG. 4 is a graphical representation of signal waveforms as a function of time helpful in understanding the mode of operation of the circuit of FIG. 3.
Figure 3:
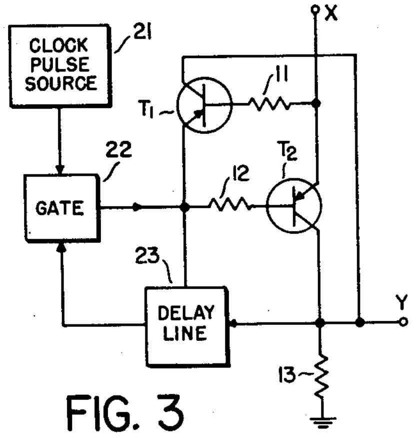
FIG. 3 illustrates the circuit of FIG. 1 in combination with a delay line to effect serial cyclic-to-standard binary conversion.

Referring to FIG. 3, the circuit of FIG. 1 is illustrated in combination with a delay line whereby cyclic binary number signals in serial form are translated into a corresponding standard binary number signal, also in serial form. This apparatus is seen to comprise the circuit of FIG. 1 with a gate 22 and delay line 23 interposed between the Y output terminal and the junction of resistor 12 with the base of transistor $T_1$. The mode of operation of this apparatus will be better understood by referring to the signal waveforms graphically represented as a function of time along a common time axis in FIG. 4.

With reference to FIG. 4A, the decimal number nine is represented as a five-digit cyclic binary number. FIG. 4B is the serial pulse train representative of the latter cyclic binary number. This pulse train is applied to input terminal X. Coincident with each interval in which a digit is manifested by the presence or absence of a pulse, there is generated a clock pulse from clock pulse source 21. The train of clock pulses is represented in FIG. 4C.

The clock pulses are applied to one input of gate 22, the other input being energized by delay line 23 which imparts a time delay D, substantially equal to the time interval between clock pulses, to the output pulses on terminal Y. The delayed output pulses, which are applied to gate 22, are represented in FIG. 4D, and the output pulses in FIG. 4E.

With the apparatus arranged as in FIG. 3, there is an output pulse on termnial Y only when the presence of an output pulse from gate 22 is accompanied by the absence of a pluse on terminal X, or presence of a pulse on the latter terminal occurs concurrently with the absence of a pulse from gate 22. The reason for gating the delayed pulses will become apparent from the discussion below.

Since the first digit of the cyclic number is Zero during the interval of the first clock pulse, there is no pulse applied to terminal X and there is no output pulse from gate 22 because no output pulse has yet appeared on terminal Y. Coincident with the second clock pulse, the second digit One of the cyclic number is represented by a pulse applied to terminal X. There is no pulse output from gate 22 at this time and so an output pulse appears on terminal Y, indicating that the second digit of the corresponding standard binary number is One. This output pulse is delayed and gated through gate 22 by the third clock pulse simultaneously with the pulse representative of the third cyclic digit One being applied to terminal X. Thus, there is no output pulse on terminal Y at this time. Since the fourth cyclic digit Zero is represented by the absence of a pulse, there is no output pulse on terminal Y during the interval of the fourth clock pulse. The fifth cyclic digit One is represented by a pulse applied to terminal X. An output pulse is derived at terminal Y at this time because there is then no output from gate 22.

The latter output pulse on terminal Y is delayed and applied to gate 22. Since a clock pulse is not then applied to gate 22, there is no output pulse therefrom. The reason for the gate now becomes apparent, for if this last delayed pulse were applied to the injunction of resistor 12 and the base of transistor $T_1$ with no pulse applied to terminal X, an output pulse would be derived across terminal Y and the resulting train of pulses might be interpreted as 010011 instead of the correct 01001.

Instead of gating the delayed pulses through in response to clock pulses, the gating circuit could be eliminated and the output signal on terminal Y sampled in synchronism with the clock pulses. The sixth digit One would then be disregarded.

Other variations of the specific embodiments described herein may be practiced by those skilled in the art. The PNP transistors could be replaced by NPN transistors and negative pulses substituted for the positive pulses. Still another variation could be practiced whereby an NPN transistor is paired with a PNP transistor. The effect of this arrangement is that conduction of both transistors would occur only when the presence of a pulse on a first input terminal was accompanied by the absence of a pulse on the second input terminal. Amplifiers may be inserted at the output of terminal Y or in between stages in the embodiment of FIG. 2.

The circuit of FIG. 2 was found to perform reliably with eight cascaded stages. Examples of typical circuit parameters are tabulated below.

| | | |
|---|---|---|
| Transistors $T_1$ and $T_2$ | | General Electric type 2N43 |
| Resistors **11** and **12** | ohms | 10,000 |
| Resistors **13** and **18** | do | 22,000 |
| Resistors **15** and **16** | do | 100,000 |
| Terminal **14** potential | volts | +22.5 |
| Terminal **17** potential | do | −22.5 |

Numerous modifications of and departures from the specific embodiments described herein may be practiced by those skilled in the art without departing from the inventive concepts disclosed herein. Consequently, the invention is to be construed as limited only by the spirit and scope of the appended claims.

What is claimed is:

1. An electronic circuit comprising first and second transistors, the base of each transistor being coupled through a separate impedance means to the emitter of the other transistor, a common load impedance coupling the collectors of the transistors to a reference potential source, means for coupling first and second input signals to the emitters of the first and second transistors respectively, and means for obtaining an output signal across the common load impedance.

2. An electronic circuit comprising first and second transistors, the base of each transistor being coupled through a separate resistor to the emitter of the other transistor, a common load impedance coupling the collectors of the first and second transistors to a reference potential source, means coupling first and second input signals to the emitters of the respective first and second transistors, and means for obtaining an output signal across the common load impedance.

3. An electronic circuit according to claim 2 and further including means biasing the bases of the transistors to a predetermined potential whereby the transistors are normally held non-conductive.

4. Apparatus according to claim 2, further including means for delaying the output signal obtained from the common load impedance, a gate interposed between the output of the delay means and the emitter of the second transistor, a clock pulse source connected to the gate to enable the gate to pass output signals from the delay means during each clock pulse, the signals passed by the gate constituting the aforesaid second input signals, and the aforesaid first input signals being applied to the emitter of the first transistor synchronously with the occurrence of clock pulses.

5. An electronic circuit comprising first and second transistors, the base of each transistor being coupled through a separate impedance means to the emitter of the other transistor, a common load impedance coupling the collectors of the transistors to a source of reference potential, means for obtaining an output signal across the common load impedance, means providing first and second input signals, each input signal assuming either one of two potential levels, and means coupling the first and second input signals to the emitters of the respective first and second transistors whereby one of the transistors is rendered conductive only when the input signals simultaneously assume different potential levels.

6. An electronic circuit comprising first and second transistors each having at least, a base, emitter, and collector electrodes, separate impedance means coupling the base of each transistor to the emitter of the other, a common load impedance coupling the collector electrodes of said first and second transistors to a point of reference potential, means for obtaining an output signal across said common load impedance and means applying first and second input signals to the emitters of said first and second transistors respectively, said first and second input signals assuming either one of two potential levels whereby said first and second transistors are non-conductive when said first and second input signals simultaneously assume the same potential level, and one or the other of said first and second transistors becomes conductive when said first and second input signals are at different potential levels.

References Cited in the file of this patent

UNITED STATES PATENTS

| | | |
|---|---|---|
| 2,730,576 | Caruthers | Jan. 10, 1956 |
| 2,758,788 | Yaeger | Aug. 14, 1956 |
| 2,762,564 | Samson et al. | Sept. 11, 1956 |
| 2,802,067 | Zawels | Aug. 6, 1957 |